United States Patent [19]
Engelke et al.

[11] Patent Number: 5,327,479
[45] Date of Patent: Jul. 5, 1994

[54] TELECOMMUNICATION DEVICE FOR THE DEAF WITH INTERRUPT AND PSEUDO-DUPLEX CAPABILITY

[75] Inventors: Robert M. Engelke, Madison; Kevin Colwell, Middleton; Ronald W. Schultz, Madison, all of Wis.

[73] Assignee: Ultratec, Inc., Madison, Wis.

[21] Appl. No.: 886,642

[22] Filed: May 20, 1992

[51] Int. Cl.$^5$ .................................. H04M 11/00
[52] U.S. Cl. ................................... 379/52; 379/98; 375/121; 370/110.1
[58] Field of Search ................. 379/52–54, 379/90, 93, 96–99, 110, 108; 340/825.19; 375/121; 370/31, 24, 110.1

[56] References Cited

U.S. PATENT DOCUMENTS

| | | | |
|---|---|---|---|
| 3,025,442 | 6/1991 | Lynk et al. | 370/110.1 |
| 3,507,997 | 4/1970 | Weitbrecht | 379/108 |
| 4,959,847 | 9/1990 | Engelke et al. | 379/98 |
| 5,091,906 | 2/1992 | Reed et al. | 370/31 |
| 5,121,421 | 6/1992 | Alheim | 379/52 |

FOREIGN PATENT DOCUMENTS

| | | | |
|---|---|---|---|
| 3632233 | 4/1988 | Fed. Rep. of Germany | 370/31 |
| 55-44283 | 3/1980 | Japan | 379/52 |

OTHER PUBLICATIONS

R. J. Cooper, "Break feature for half-duplex modem", IBM Technical Disclosure Bulletin, vol. 17, No. 8, pp. 2386-2387 Jan. 1975.

Primary Examiner—Wing F. Chan
Attorney, Agent, or Firm—Quarles & Brady

[57] ABSTRACT

A telecommunication device for the deaf operates under conventional Baudot communication protocol, but has enhanced features enabling it to handle interrupts either from a conventional or a similar TDD. The improved TDD is also capable of pseudo-duplex communication with a similar TDD in which each device transmits packets of characters alternatively to the other thus making it appear to the users that simultaneous transmission is occurring. The implementation of these features is done in such a way that the TDD is fully capable of communication with existing TDD devices and the device obeys normals rules and conventions for Baudot communication.

20 Claims, 3 Drawing Sheets

TELECOMMUNICATION DEVICE FOR THE DEAF WITH INTERRUPT AND PSEUDO-DUPLEX CAPABILITY

FIELD OF THE INVENTION

The present invention relates to telecommunication devices for the deaf in general, and, in particular, to improve telecommunication devices for the deaf which offer increased conversation-like ability while maintaining compatibility with existing devices already in use.

BACKGROUND OF THE INVENTION

Persons who are deaf or hearing impaired who cannot hear well enough to use the telephone commonly make use of communication terminals specifically constructed in design to enable such persons to converse over telephone lines. Such devices are referred to as telecommunication devices for the deaf, or TDD's, and include both a keyboard and a display connected to the telephone through a modem (modulator/demodulator). The modem is typically built into a TDD connected either by hard wiring directly to a telephone line or through an acoustic coupler which couples the modem to a normal telephone handset. TDD's are normally capable of transmitting information over a telephone line by means of coded tones to another compatible TDD connected at the opposite end of the telephone line through another modem.

There are several protocols that are used for transmitting digital information through analog lines such as telephone lines. The most commonly used information protocol in the electronics industry is referred to as ASCII (American Standard Code for Information Interchange). The ASCII code was designed for and is most commonly used for information interchange between computers. However, largely due to historic reasons, TDD's have operated on a different protocol, originally developed specifically for TDD communication. This TDD protocol is referred to here as the Baudot/Weitbrecht, or standard Baudot, and includes both a specific 5-bit Baudot code and a frequency shift keying (FSK) protocol of electronic communication. The standard Baudot communication is simplex, that is to say it is capable of only transmitting in one direction at one time. Therefore, during normal TDD communication, one station must be silent while the other is transmitting. It has become a convention that one TDD user informs the other TDD user when it is the other user's turn to utilize the communication link.

The inability of the traditional Baudot/TDD communication network to permit bi-directional or duplex communication of the network created by this form of communications has been an inadequacy since its inception. Under current TDD/Baudot communication protocols, if both users attempt to transmit at the same time, each station will only display to the user the characters it is transmitting. This is because standard Baudot TDD's are designed to give priority to transmission. Since prior TDD's cannot receive data while transmitting, when transmitting standard TDD's make no attempt to receive incoming characters. This creates obvious difficulties in the use of TDD systems for communication between individuals and makes such communication not similar to normal human communication. As in even a brief monitoring of oral communication between hearing individuals will indicate, human speech is characterized by constant interruptions and interchange. The current TDD/Baudot communication network is incapable of handling such interruptions and interjections, and hence is less similar to audible human conversations than would be desired in an ideal system.

In addition, it is often desired that during a TDD communication that one user be able to signal or interrupt the other user. Often, for example, one user may be launched onto a long description, or explanation, which the other user is already aware of or has heard before. In normal human audible conversation, a listener can indicate to the speaker that he has already heard that part of the explanation. In TDD communication, due to the simplex nature of the communication link, the receiver is unable to communicate with the transmitter until the transmission is complete. Since communications can sometimes be quite long, this is a source of frustration and time delay, and hampers normal human tendencies during conversation. Heretofore the standard Baudot/Weitbrecht network has been incapable of handling such tendencies.

There was one instance known of an attempt to permit interruption in a communication device operating under Baudot protocol. One of the early originators of TDD communications in the United States, Mr. Weltbrecht instituted a "news service" for the deaf community in the United States accessible by telephone. Mr. Weitbrecht constructed what was, in essence a recording device, which played out a periodic news compilation in Baudot communication to any TDD that would dial the phone number associated with the news service. In that time period, it was common for TDD's to listen for space tones (1800 Hertz) only, and to not even sense mark tones (1400 Hertz). A receiving TDD would simply assume absence of space tones during a character meant mark. Utilizing this characteristic, Weitbrecht constructed the news service device so that if it was to transmit a bit sequence of three marks (or 1's) at any point during the transmission, the device would simply stop transmitting the mark tone and listen for tones from the communicating station. If tones were sensed during the interval, the news service device would cease transmission. This feature was transparent to users at that time since most TDD's of the era did not detect mark tones. This characteristic is no longer true of modern electronic TDD's.

SUMMARY OF THE INVENTION

In accordance with the present invention, a telecommunication device for the deaf is constructed which operates so as to observe two rules which constrain its activity so as to permit interrupts and pseudo-duplex activity. The two rules are that the terminal is not permitted to transmit when it is receiving transmissions from a device with which it is communicating. The second rule is that the terminal creates a pause in the communication line at periodic intervals of transmitted characters and, during that pause, senses for transmissions by the remote terminal. The combination of these two rules in the operation of a telecommunication device permits the device both to be interrupted, and permits pseudo-duplex communication between two telecommunication devices for the deaf.

It is an object of the present invention to provide a telecommunication device for the deaf which is capable of providing an interrupt signal from one user to another, which is still compatible with and capable of communicating with existing TDD devices previously installed within the deaf community.

It is yet another object of the present invention to provide a telecommunication device for the deaf which is capable of providing two-way communication, or pseudo-duplex communication, while still being fully compatible with existing telecommunication devices for the deaf already installed in the deaf community.

It is another object of the present invention to provide a telecommunication device of the deaf which is capable of providing interrupt and pseudo-duplex capabilities, while also being capable of communicating with an enhanced TDD protocol permitting faster speeds of communication.

It is an advantage of the present invention in that it can be implemented totally in microcode, or firmware, where changes to existing TDD designs so as to permit cost-effective and convenient retrofitting of existing TDD's in the field so that the benefits of these enhanced methods of TDD communication can be utilized by the existing community of TDD users.

The pseudo-duplex and interrupt capabilities will also result in a net savings of on-line time and telephone costs as users can interrupt previously transmitted communications. This results also in more natural conversation-like communications. Also the interrupt capability allows for handling emergency communications more effectively.

Other objects, advantages, and features of the present invention will become apparent from the following specification when taken in conjunction with the accompanying drawings.

DESCRIPTION OF THE INVENTION

In accordance with the present invention, a telecommunication device for the deaf has built into its functioning an enhanced set of protocols which enable it to communicate with conventional Baudot terminals and also to be capable of handling an interrupt situation and also handling bi-directional, or pseudo-duplex, communication. The ability to do both the interrupt and the bi-directional communication arises from the terminal following two relatively simple rules in its method of operation. The first rule is that the terminal is constrained not to present carrier or characters on the communication line when the other terminal with which it is communicating is presenting such characters. The second rule is that the terminal is constrained to present a pause, or null, on the communication line at predetermined intervals, i.e. after the transmission of a specific number of characters. The implementation of these two rules in a telecommunications device enables such devices to interrupt each other, and to communicate in a pseudo-duplex fashion to each other. The implementation of these rules does not prevent communication between such an improved TDD and a conventional TDD.

Figure 1:
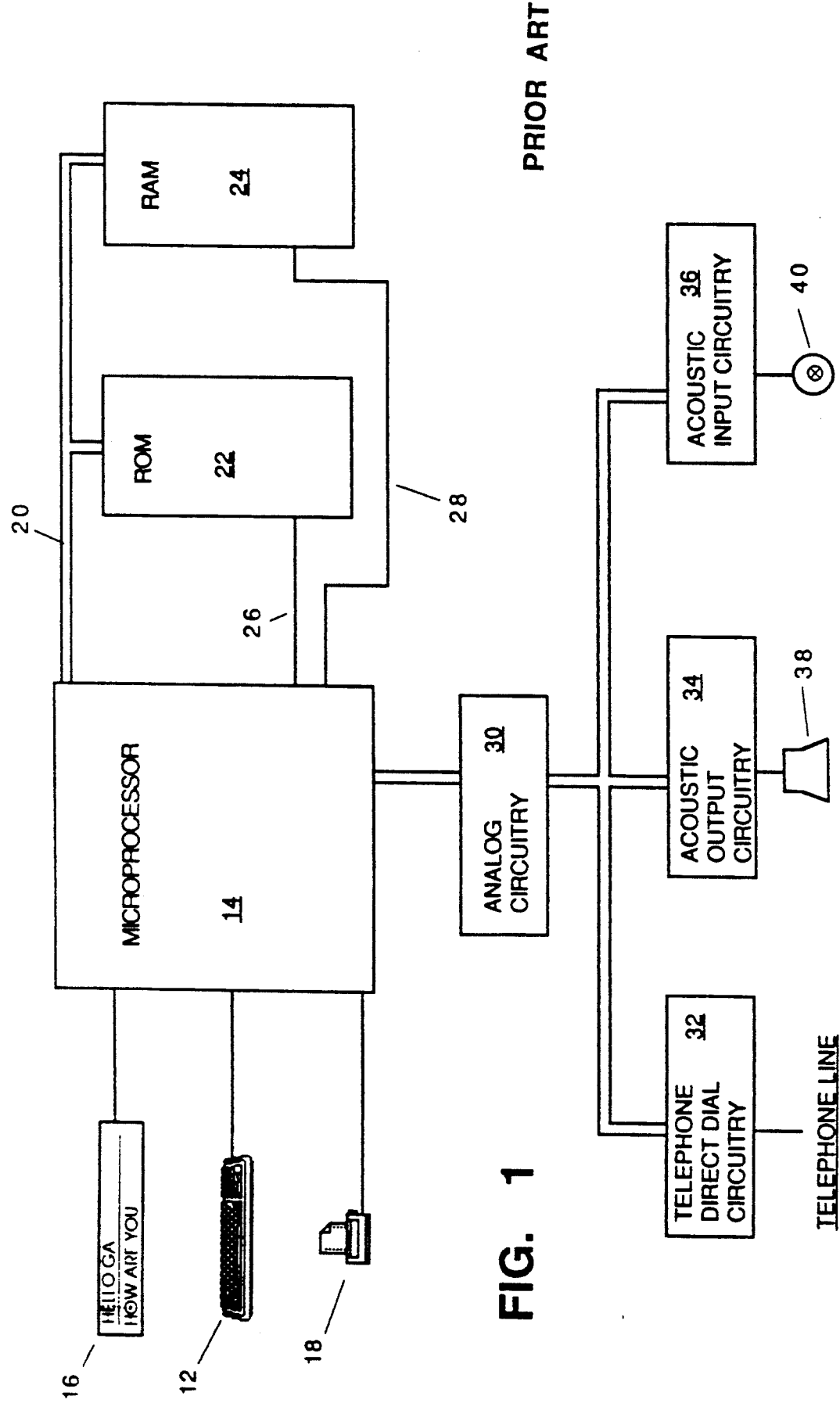
FIG. 1 is a schematic diagram of prior art TDD hardware suitable for use with the present invention.

Shown in FIG. 1 is a schematic block diagram of the function of a typical TDD. In the TDD of FIG. 1, the user types on a keyboard indicated at 12 to input characters into a microprocessor indicated at 14. Characters which are received or transmitted by the microprocessor are also displayed to the user on a visual electronic display, indicated at 16. Characters may also optionally be displayed by means of a hard copy printer, indicated at 18, which some TDD's include. Thus the keyboard serves as the source of input data characters and either or both of the display 16 and the printer 18 serve as ultimate destinations for the data characters. The microprocessor 14 is largely responsible for the implementation of the various timing and decoding functions of the TDD. The microprocessor has data and address buses, jointly indicated at 20, which connect to a read-only memory (ROM) 22 and a random access memory (RAM) 24. Appropriate control lines 26 and 28 connect to the ROM 22 and RAM 24 so as to control the operation thereof. The ROM is intended to contain the program which dictates the functional operation of the microprocessor 14. The RAM is utilized as a holding place or stack for data coming into or out of the TDD. In some TDD's, the microprocessor, the RAM and the ROM are all combined in a single integrated circuit, while in others they are separate circuits.

As an additional output, the microprocessor connects through analog circuitry 30 to one of three separate outputs. The analog circuitry 30 is, most preferably, a modem. One output of the analog circuitry 30 could be a telephone direct connect circuitry 32 which connects the modem directly by hardwiring into the telephone network. A second possible output from the analog circuitry is through an acoustic output circuit 34 intended to audibly connect through a speaker 38 to the microphone of a telephone handset. At 36 is indicated acoustic input circuitry connected to a microphone 40, which is intended to audibly couple to the speaker in a telephone handset. The acoustic output speaker and the acoustic input microphone may be connected through a so-called "acoustic coupler" to a conventional telephone handset. In any TDD, either the hardwired connection or the acoustic connection is provided, and sometimes both. It is also envisioned that the telephone line need not be a physical link. A TDD could be made to operate as a cordless phone or through a cellular telephone system rather than through a conventional telephone two-wire connection.

Figure 2:
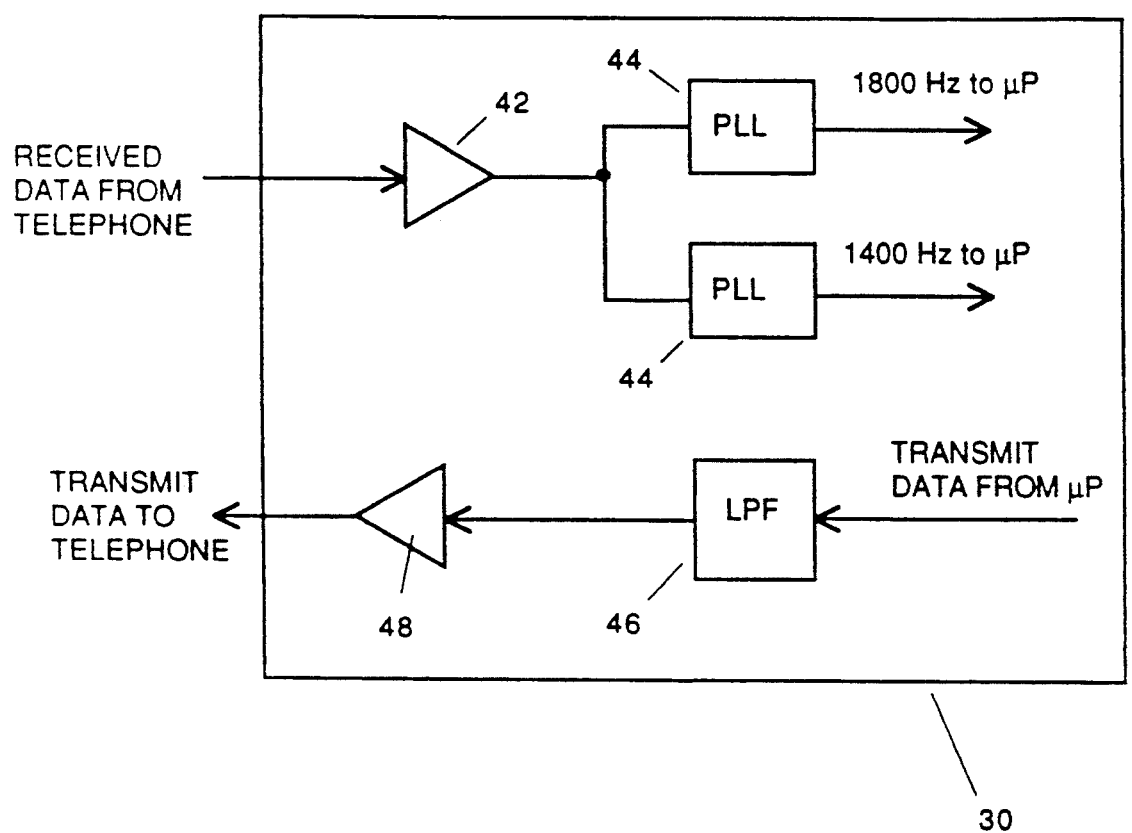
FIG. 2 illustrates schematic details of the prior art analog circuit of FIG. 1.

Shown in FIG. 2 is a simplified schematic of how the input and outputs of the analog circuitry would work. For data coming into the terminal, the audible input from a microphone or telephone line is translated into electronic components and then presented to an amplifier 42. The output of the amplifier is presented to two phase-locked-loops 44. One of the phase locked-loops 44 is tuned to a frequency of 1800 Hertz, while the other phase-locked-loop 44 is tuned to a frequency of 1400 Hertz. 1800 Hertz and 1400 Hertz are the designated carrier frequencies for standard Baudot communication. On the output side of the circuitry, output signals are presented to a LPF (low pass filter) transmit wave shaping circuit 46. The output of that circuit, consisting of alternate 1400 and 1800 Hertz signals, is presented to an amplifier 48 which is hardwired to the speaker or telephone line.

In normal Baudot communications with existing TDD's, each TDD communicates at 45.5 baud in a simplex mode. In some countries, the protocol is the same but the speed is 50 baud. That is to say each TDD transmits a character on the line whenever a key is pressed at the TDD. As a result, in order to approximate the give-and-take of normal conversation, TDD users generally have to indicate to the other user when the user that has the floor is ending that particular communication. For example, it is quite common convention in the United States to type the letters "GA" as an abbreviation for "go ahead" at the end of a text string to indicate to the other user that it is his or her turn to type. This procedure is awkward and not like normal conversation. Also, occasionally users wish to interrupt and, regardless of the constraints of their machine, do attempt to type keys into their machine while receiving data. Such attempts to interrupt are typically not successful since the station transmitting data does not monitor the line for incoming data.

The TDD of the present invention is constrained not to even attempt truly simultaneous communication. The improved TDD described here is simply programmed not to transmit data when data is being received. This concept is directly opposite to the conventional operation of TDD's, but is effective if utilized as described here. It is a relatively simple matter that, when the microprocessor senses that a key has been pressed during data reception and which is intended to ultimately transmit a character to the remote station, for the microprocessor first to test whether analog data is being received. If data is being received, the microprocessor is constrained by the software not to immediately output the character onto the transmit line but, instead, to store the appropriate characters which have been entered by the user into the RAM. Typed characters are also stored in a queue or stack during all times of data reception. The user may continue to type, and the characters are entered by the keyboard, and are placed into the RAM, until such time as communication from the remote station has ceased.

When it is time for the station in accordance with the present invention to transmit, the improved TDD transmits characters either directly from its keyboard, or from the buffer composed of the RAM, out through the transmission line. The pseudo-duplex capable TDD of this invention will, however, cause periodically during the transmit data stream. The device is programmed to pause after the transmission of a pre-determined number of characters. The purpose of the pause is for the terminal to test during the pause whether input data is being received. In other words, the pause serves as an interrupt window for the other communicating machine. Since the device is constrained not to transmit when receiving, if, during a pause, the other remote machine begins transmitting the local terminal will cease transmission. In this way, most of the situations in which the two terminals would simultaneously transmit data are avoided. It is still possible occasionally for simultaneous data transmissions to occur, when both stations simultaneously transmit data onto the line, but these situations will be quite rare.

The number of characters which are transmitted by the TDD in accordance with the present invention before a pause is subject to some variation between two extremes. At one extreme, it is possible to present a pause on the transmission line after the transmission of every single character. While this choice minimizes the number of potential data collisions on the telephone line, it also slows down the transmission when conducted at ordinary Baudot transmission rates. Since Baudot operates relatively slow in any event, i.e. at 45.5 Baud, which approximates 6 characters per second, adding an extra bit time or two to every character might perceptively slow down the transmission by the terminal. At its upper limit, it is clearly possible to impose such a pause every 72 characters, since the normal constraints of conventional Baudot communication protocols require that a carriage return and line feed be implemented every 72 characters followed by a pause, originally imposed to allow for a mechanical TDD systems which must mechanically return the printing head. Thus there is an automatic pause time traditionally included in Baudot/Weitbrecht protocol at least every 72 characters within the data stream, by convention. In its preferred embodiment, it is anticipated that the number of characters which will be transmitted in between pauses would be between 1 and 72, and most preferably between 1 and 10. Actual empirical testing of terminals on a number of communication lines is necessary to determine which is the exact and optimum number of characters to be transmitted between pauses.

The length of the pause after the packet of characters should be sufficient so as to permit settling of the communication line, a time period sufficient for the other terminal to commence data transmission, and a time period sufficient for the pausing station to sense that data is being transmitted to it over the telephone line. These times can be varied over a wide range depending on the quality of the telephone network and the timing constraints of the hardware in the TDD. The normal bit time of conventional Baudot communication is approximately 22 milliseconds. After transmitting Baudot tones, it can typically take some telephone lines some time period for echoes, transients, and other chatter introduced on the line by previous communication signals to fade. In most modern telephone systems, a time period of five to fifty milliseconds is needed to permit such settling. A TDD in the accordance with the present invention pauses for a time period divided into two portions. The first portion is a pause for a sufficient time period, such as 10 milliseconds, to permit the telephone line to settle. The second pause is for a sufficient time period, such as, 10 to 44 milliseconds, which is sufficient time for the transmitting terminal to initiate transmission and for the transmission to be sensed by the pausing station. An interrupt-competent and pseudo-duplex TDD constructed in accordance with the present invention will therefore often have to buffer data being typed in by the user. During time periods in which the user is typing at the keyboard, but the terminal is constrained from transmitting characters due to the receipt of characters from the remote terminal, the data characters being entered by the user would be stored in the random access memory in a stack or queue. Then, during the station's next interval for transmission, it would transmit characters on a first-come first-serve basis out of the queue onto the transmission line.

This system is capable of operating either in conventional Baudot/Weitbrecht or in a newly designed enhanced Baudot communication protocol. Nevertheless, it is an advantage of the operation of this machine that it is capable of operating also with conventional TDD's, without any alteration to the conventional machines. If the TDD of the present invention is communicating with an otherwise conventional remote TDD, the remote terminal could occasionally lose characters if keys are pressed while it is receiving. The pseudo-duplex TDD will tend to drop fewer characters since it cannot transmit when the remote terminal is transmitting. In addition, any such losses at the remote terminal are minimized, since the TDD in accordance with the present invention creates a pause at predetermined intervals, and when the first of those intervals occurs, the pseudo-duplex TDD will stop transmitting. Thereafter, the pseudo-duplex TDD will be able to receive whatever information is being transmitted by the station with which it is communicating. Clearly the fewer the number of characters transmitted between pauses, the fewer the number of characters which might be lost.

As an option, it may also be appropriate to include an interrupt signal in the TDD of the present invention. If such an interrupt sign is implemented, the microprocessor would as usual, monitor the input line during times it is not transmitting data to test for signals. The TDD would thus detect any data signal received during the periodic pause, even if the terminal still had characters to transmit. The microprocessor would then visually signal to the user that an interrupt is being initiated by the remote station. The visual interrupt signal could consist of the word "interrupt" on the display, could consist of the display of a specially designated character not in the normal Baudot character set, such as an asterisk or could consist of any characteristic character, word or pattern designated for this purpose. Another alternative is to split the display into two sets (input and received characters) and the user can be informed of the interrupt by noticing the split display. Then the user may cease typing on the keyboard, to permit the transmission from the remote station to be received by the terminal and displayed appropriately.

In the event that two interrupt-competent TDD's in accordance with the present invention are communicating, missing transmitted data becomes an extremely unlikely event. In normal communication, when either one of the two terminals is transmitting, the other terminal is constrained not to transmit. Then, since each station when transmitting is constrained to stop after a certain number of characters and present a pause, during that pause the other station will gain control of the communication line. Then that station will transmit until its turn to pause. For example, if the persons at stations A and B are both typing at the same time, one of the two TDD's at each station will initially gain control of the communication line, and transmit the predetermined number of characters. Assume, for purposes of this example, that the number of transmitted characters is seven. Station A would transmit seven characters to Station B, and Station B would be constrained not to transmit during that interval. At the end of the transmission of the seventh character, Station A would pause and Station B would seize control of the communication line and then communicate seven characters to Station A. After that time period, Station B would pause, and Station A would resume control of the communication lines. In other words, each station would separately transmit to the other a burst of characters during alternate time periods. In this way, it would appear to the users as if a full duplex communication were occurring. This form of communication is referred to here as pseudo-duplex, since the actual technical communications over the telephone line is in simplex, i.e. with only one station able to communicate at an instant, while the appearance to the users is of duplex, or two-way, communication.

Obviously, if a station is alternately both transmitting and receiving data in groups of small numbers of characters, some provision must be made to make the display appropriate and readable to a user. At least two options are possible. One option is simply to have the user only see the information received from the foreign station. The other, a more preferable option, is to split the screen of the display on the terminal. This split can be either vertical for one-line displays or horizontal if there is a two line or larger display. One portion of the split screen would be reserved for the characters being transmitted by the terminal and other portion of the split screen would display the characters being received from the remote terminal. Such split-screen operation is entirely within the capability of the microprocessor to effectuate, the screen display being under software control in any event.

Figure 3:
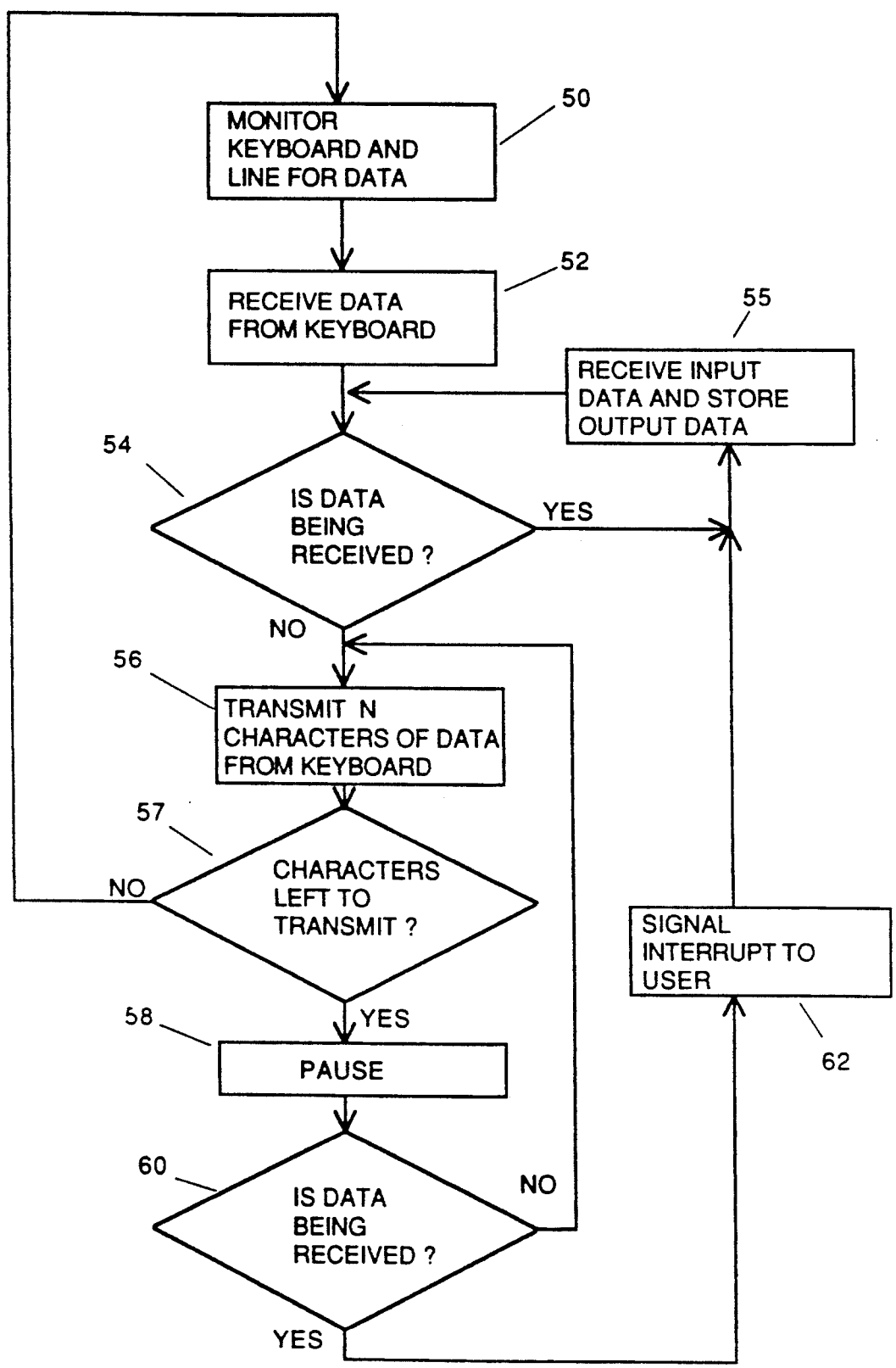
FIG. 3 is a flow chart illustrating the method of operation of a terminal operating in accordance with the present invention.

Shown in FIG. 3 is a flow-chart representation of the workings of the terminal of FIGS. 1 and 2 operating in accordance with the present invention. At step 50, the microprocessor monitors the keyboard and the incoming telephone line for data. This step is performed in the normal fashion by which TDD's perform these functions. When a user presses a key the key selected by the user represents data which is accepted from the keyboard at method step 52. Most conventional prior TDD's would immediately transmit the character to the telephone line. Instead the pseudo-duplex TDD first checks to ensure that no data is being received on the telephone line. If data is being received the program branches and continues to receive the input data and buffer the output data until the incoming character stream ceases. This step is indicated at 55. Once the received data is stopped, the program may proceed back through the step of detecting whether data is being received at step 54. Once the situation arises where no data is being received, the program then proceeds to step 56 where it transmits N characters of data from the keyboard. In this instance the letter N represents the numbers of letters in the character packet which is transmitted by the pseudo-duplex TDD. As stated, the number N can be between 1 and 72 and is preferably between 3 and 10. After the characters packet has been transmitted, the program then determines whether or not there are characters left to transmit. If all the characters have been transmitted the program can return to its monitoring state at step 50. If there are more characters left to transmit, the TDD does not immediately begin to transmit the new characters, but instead imposes a pause at step 58. During the pause at step 58, the remote TDD may start transmitting data. Thus, at step 60 the TDD senses whether data is being received. At step 60, the machine has paused during a data transmission. Accordingly, if data is being received, that represents an interrupt by the remote station. Accordingly, the program proceeds at step 62 to provide an interrupt signal to the user. Nevertheless the device still receives the data from the remote device and stores the potential output characters, again at step 55, rather than transmitting characters onto the transmission line. At step 60 if no data was being received the program can branch back to step 56 and transmit characters again. The result of all of these steps is the implementation of the two rules discussed above. Steps of FIG. 3 result from following the two rules of simply not transmitting when data is being received and also pausing after the transmission of every N character to permit the remote station to transmit.

Thus, the pseudo-duplex TDD terminal constructed in accordance with the present invention is fully capable of pseudo-duplex communication with a compatible TDD. At the same time, the terminal is capable of communication with conventional TDD's, which would simply ignore the brief pause during the character transmission time. In addition, the pseudo-duplex TDD is competent to handle interruptions, so if the pseudo-duplex TDD is communicating with a conventional TDD, and the conventional TDD begins to transmit, there may be a brief loss of a few characters, but then during the appropriate transmission pause, the pseudo-duplex TDD will recognize that a transmission is being received, and inhibit further character transmissions until the next pause. Thus the device is compatible with existing TDD's in the communication network, and does not require any modifications or changes in operation to existing TDD's in order to be compatible with this new device. Users do not have to alter their habits to use the improved TDD yet will appreciate the advantages it offers.

It is a further advantage of the present invention in that it can be implemented and upgraded to existing TDD's by software upgrade. As may be seen in FIG. 1, the hardware portions of the circuit have to do with the analog input and output. The detail transmission behavior of the device, including the timing of transmitted data bits, and the translation of characters into Baudot code, are all handled under software control by the program for the microprocessor contained in the ROM. Thus, to retrofit old TDD's with the pseudo-duplex capability, all that needs to be replaced is the ROM in the older TDD. With a replacement of a single integrated circuit, the older conventional TDD can be given the capability of handling an interrupt and acquire the pseudo-duplex capability described in the present invention.

It is understood that the present invention is not limited to the particular embodiments illustrated herein, but embraces such modified forms thereof as come within the scope of the following claims.

We claim:

1. A telecommunication device for the deaf for communication over an analog telephone line, the device comprising:
   a source of input data characters to be transmitted;
   a destination for received data characters;
   a microprocessor operating in accordance with a stored program code and connected to accept input data characters from the input source and to deliver data characters to the destination;
   an analog input circuit adapted to being connected to the telephone line so as to be responsive to the reception of Baudot tones over the telephone line and also connected to the microprocessor so as to provide a digital input to the microprocessor of the data received over the telephone line;
   an analog output line adapted to being connected to the telephone line so as to be capable of presenting Baudot tones over the telephone line and also connected to receive data from the microprocessor and transmit Baudot tones encoding such data over the telephone line; and
   a memory device connected to the microprocessor containing the program code for operation of the microprocessor to control operation of the microprocessor to control operation of the telecommunications device to generally
   (i) receive data entered from the input source;
   (ii) present entered data from the input source on the analog output line;
   (iii) receive input data from the analog input line; and
   (iv) deliver data received on the input analog line to the destination;
   the program code further constraining the microprocessor to operate in accordance with the following rules:
   (a) if any Baudot tones are being receiving on the input circuit, to not present output Baudot tones on the telephone line through the analog output line; and
   (b) during transmission, to pause after a preselected number of data characters transmitted to the test during that pause for the receipt of any Baudot tones over the analog input circuit.

2. A telecommunication device for the deaf as claimed in claim 1 further comprising a visual interrupt signal which is actuated by the microprocessor when transmissions are received during the transmission pause.

3. A telecommunication device for the deaf as claimed in claim 1 wherein the pause includes two time periods, the first time period being of sufficient length for the telephone line to settle and the second time period being of sufficient length so that a remote telecommunications device could begin transmission and the transmission could be detected.

4. A telecommunication device for the deaf as claimed in claim 3 wherein the pause is for a time period of between five milliseconds and two seconds, with a first portion of the pause between a delay for the telephone line to settle and a second portion of the pause being the time period of testing for the receipt of transmissions.

5. A telecommunication device for the deaf as claimed in claim 4 wherein the pause is between ten and two hundred milliseconds.

6. A telecommunication device for the deaf as claimed in claim 1 wherein the preselected number of data characters is between one and seventy-two.

7. A telecommunication device for the deaf as claimed in claim 1 wherein the preselected number of data characters is between one and ten.

8. A telecommunication device for the deaf as claimed in claim 1 wherein the input source is a manually operable keyboard.

9. A telecommunication device for the deaf as claimed in claim 1 wherein the destination is a visually readable display.

10. A method of operating a telecommunication device for the deaf including a keyboard, a display, a microprocessor connected to receive data from the keyboard and present data to the display, input and output analog circuits to connect the microprocessor to a telephone line, and a memory circuit the method comprising the steps of
   (a) receiving from the keyboard data from a user;
   (b) transmitting the data received from the user onto the telephone line as output data only when no input data is being received form the telephone line;
   (c) when transmitting data onto the telephone line, pausing for at least one bit time after a preselected number of characters and testing for the presence of any input data on the telephone line; and
   (d) displaying on the display both the input and the output data.

11. A method as claimed in claim 10 wherein in step (c), the pause includes two time periods, the first time period being of sufficient length for the telephone line to settle and the second time period being of sufficient length so that a remote telecommunications device can begin transmission and the transmission can be detected.

12. A method as claimed in claim 10 wherein in step (c), the pause is for a time period of between five and fifty milliseconds.

13. A method as claimed in claim 10 further comprising the step of visually signalling the user if data is received during the pause of step (c).

14. A telecommunication device for the deaf comprising:
   a keyboard;
   a visually readable display;
   a microprocessor operating in accordance with a stored program code connected to accept input data characters from the keyboard and to present data characters on the display;
   an analog input circuit adapted to being connected to a telephone line so as to be responsive to the reception of Baudot tones over the telephone line and also connected tot he microprocessor so as to provide a digital input to the microprocessor of the data receive over the telephone line;
   an analog output line adapted to being connected to the telephone line so as to be capable of presenting Baudot tones over the telephone line and also connected to receive data from the microprocessor and transmit Baudot tones encoding such data over the telephone line; and
   a memory device connected to the microprocessor containing the program code for operation of the microprocessor to control operation of the telecommunications device to generally
   (i) receive data entered from the keyboard,
   (ii) present entered data from the keyboard on the analog output line,
   (iii) receiving input data from the analog input line, and
   (iv) display data from both the keyboard and the input analog line on the display; the program code further constraining the microprocessor to operate in accordance with the following rules:
      (a) if Baudot tones are being received on the input circuit, to not present output Baudot tones on the telephone line through the analog output line;
      (b) during transmission, to pause after a preselected number of data characters transmitted and to test during that pause for the receipt of any Baudot tones over the analog input circuit;
      (c) to provide a visual output to the user indicating interrupt when data is received during the time period of a pause.

15. A telecommunication device for the deaf as claimed in claim 14 wherein the visual indication is the presentation of the word "Interrupt" on the display, 16. A telecommunication device for the deaf as claimed in claim 14 wherein the visual indication is the presentation of a symbol not in the conventional Baudot character set on the display, 17. A telecommunication device for the deaf comprising
   a source of input characters to be transmitted;
   a destination for received characters;
   a microprocessor connected to accept input data characters from the input source and to deliver received data characters to the destination;
   an analog input circuit adapted to being connected to a telephone line so as to be responsive to the reception of Baudot tones over the telephone line and also connected to the microprocessor so as to provide a digital input to the microprocessor of the data received over the telephone line;
   an analog output line adapted to being connected to the telephone line so as to be capable of presenting Baudot tones over the telephone line and also connected to receive data from the microprocessor and transmit Baudot tones encoding such data over the telephone line; and
   a memory device connected to the microprocessor containing the program code for operation of the microprocessor to control operation of the telecommunications device to generally (i) receive data entered from the input source, (ii) present entered data from the input source on the analog output line, (iii) receive data from the analog input line, and (iv) deliver received data from the input analog line and deliver the received data to the destination; the program code further constraining, during transmission, to pause after a preselected number of data characters transmitter and to test during that pause for the receipt of any Baudot tones over the analog input circuit.

18. A telecommunication device for the deaf as claimed in claim 17 wherein the input source is a keyboard.

19. A telecommunication device for the deaf as claimed in claim 17 wherein the destination is a visually readable display.

20. A telecommunication device for the deaf comprising:
   a keyboard;
   a visually readable display;
   a microprocessor operating in accordance with a stored program code connected to accept input data characters from the keyboard and to present data characters on the display;
   an analog input circuit adapted to being connected to a telephone line so as to be responsive to the reception of Baudot tones over the telephone line and also connected to the microprocessor so as to provide a digital input to the microprocessor of the data received over the telephone line;
   an analog output line adapted to being connected to the telephone line so as to be capable of presenting Baudot tones over the telephone line and also connected to receive data from the microprocessor and transmit Baudot tones encoding such data over the telephone line; and
   a memory device connected to the microprocessor containing the program code for operation of the microprocessor to control operation of the telecommunications device to generally
   (i) receive data entered from the keyboard,
   (ii) present entered data from the keyboard on the analog output line,
   (iii) receive input data from the analog input lie, and
   (iv) display data from both the keyboard and the input analog line on the display;
   the program code further constraining the microprocessor to operate in accordance with the following rules:
      (a) if Baudot tones are being receiving on the input circuit, to not present output Baudot tones on the telephone line through the analog output line; and (b) during transmission, to pause after a preselected number of data characters transmitted and to test during that pause for the receipt of any Baudot tones over the analog input circuit, the microprocessor also programmed to present on the visually readable display both the characters being transmitted and the characters being receiving in separate portions of the display.

* * * * *